United States Patent [19]

Wier

[11] Patent Number: 4,712,811
[45] Date of Patent: Dec. 15, 1987

[54] CONNECTOR AND A METHOD OF CONNECTING PIPES

[76] Inventor: Jan H. Wier, Burleigh, Bulls, New Zealand

[21] Appl. No.: 781,784

[22] Filed: Sep. 30, 1985

[30] Foreign Application Priority Data

Sep. 28, 1984 [NZ] New Zealand ............ 209718

[51] Int. Cl.$^4$ ............................................. F16L 17/02
[52] U.S. Cl. ......................................... 285/113; 285/307;
285/323; 285/342; 403/371; 29/450
[58] Field of Search ............... 285/307, 323, 322, 339,
285/243, 113, 342; 29/450; 403/368, 371

[56] References Cited

U.S. PATENT DOCUMENTS

| | | |
|---|---|---|
| 1,448,953 | 3/1923 | Crescio . |
| 2,161,694 | 6/1939 | Becker . |
| 2,535,623 | 12/1950 | Becker . |
| 2,837,353 | 6/1958 | Ashbrook .............. 285/113 X |
| 3,600,010 | 8/1971 | Downs .............. 285/113 X |
| 3,653,689 | 4/1972 | Sapy et al. . |
| 3,743,326 | 7/1973 | Courtot et al. . |
| 3,815,940 | 6/1974 | Luckenbill ............ 285/323 X |
| 4,083,586 | 4/1978 | Helm . |
| 4,323,727 | 4/1982 | Berg . |
| 4,440,424 | 4/1984 | Mode . |
| 4,508,369 | 4/1985 | Mode . |

FOREIGN PATENT DOCUMENTS

| | | | |
|---|---|---|---|
| 405784 | 11/1924 | Fed. Rep. of Germany ...... 285/322 |
| 277956 | 11/1964 | Netherlands ................ 285/113 |

Primary Examiner—Dave W. Arola
Attorney, Agent, or Firm—Holman & Stern

[57] ABSTRACT

A connector for and a method of connecting pipe members for a variety of purposes including (but not limited to) plumbing, hydraulics, pneumatics and medical purposes. Wherein the connector which can be used in conjunction with other fittings, has a connector body with an opening to receive a pipe and a tapered internal bore in the opening to receive a substantially coaxial inner sleeve adapted to engage the surface of the pipe in the connector. After insertion, the pipe is then moved in an opposite direction to the direction of insertion and the inner sleeve is adapted to slide wherein internal bore to wedge into frictional engagement and connection with the outer surface of the pipe and the tapered surface of the internal bore so that when the pipe is sealably engaged within the connector the pipe can be disengaged from the connector by a reverse operation. The connector has the advantage that a pipe may be sealably engaged in the connector without the necessity to work the pipe, in a connector comprised of two components manufactured of plastic materials. The inner sleeve may have sealing ridges to increase the sealing capabilities of the connector.

14 Claims, 2 Drawing Figures

CONNECTOR AND A METHOD OF CONNECTING PIPES

BACKGROUND OF THE INVENTION

1. Field of the Invention

This invention concerns a method of connecting pipe members for a variety of purposes including (but not limited to) plumbing, hydraulics, pneumatics and medical purposes. The invention also includes a connector which is suitable for connecting pipe members for the suggested purposes, and which is also able to be used in conjunction with other fittings for these purposes.

2. Description of the Prior Art

A wide variety of connectors are known for the above mentioned purposes in which a variety of different types of pipe and tube are used depending upon the particular purpose. Because of its versatility, the use of plastics pipe and tubing is increasing in use for the above described purposes. It is considered that it would be advantageous to provide a plastics connector usable in conjunction with pipe members and tubing in which it was not necessary to use tools to effect connection beween the connector and the pipe. It is also considered that it would be useful to provide a connector which was adapted to make proper connection with a wide variety of pipes without any requirement for working of the pipe to make a proper connection.

The connectors presently known have often included a male and female type coupling by way of a thread or other interlocking designs. Alternatively, the pipe member is forced over a nipple on a male connector which often causes damage to the pipe. In other embodiments, a compression type fitting is used whereby a collet member is compressed by a backing nut onto the pipe wall. In general, connectors of these types have been of a design and construction requiring a large number of different types of connectors for various different purposes. Furthermore, the commonly used compression fittings do not compensate for subsequent creep in the pipe so that an inadequate grip on the pipe can result in a continuous use application.

The provision of a connector according to this invention envisages a plastics connector member of a simple design which is adaptable for a wide variety of purposes and for a range of diameters of pipes or tubes.

BRIEF SUMMARY OF THE INVENTION

It is therefore an object of this invention to provide a method of engaging a pipe or tube in a connector member, and a connector member, which goes at least some way to overcoming the disadvantages which have been found in methods of connecting and connector members known in the art. The invention also provides an improved connector member for fitting with pipes or tubes of a substantially round cross section and whether or not they include a generally smooth surface. Other objects and advantages of this invention will become apparent from the following description. It is also an object of the invention to provide a connector member manufactured of plastics material which is of a simple yet efficient design, and which may be economically mass produced.

According to a first aspect of this invention there is provided a connector including a connector body with an opening at one end and a tapered bore of a diameter increasing from the opening extending in the direction of its longitudinal axis, and a substantially coaxial inner sleeve of plastics material positioned in the connector body, the inner sleeve being of a substantially frusto-conical shape substantially complementary to the bore in the connector body and including a bore extending in direction of its axis having a substantially rounded cross section and being smaller than or corresponding to that of a pipe to be located in the connector, the connector providing that a pipe inserted into the bore in the inner sleeve of the connector, can be moved in the opposite direction to the direction of insertion so that the inner sleeve will wedge into frictional engagement and connection to the surface of the pipe and the inner surface of the connector body, to engage the pipe in the connector.

According to a further aspect of this invention there is provided a method of locating a substantially round (in cross section) pipe member in a connector, the connector including a connector body with an opening at one end and a tapered bore of a diameter increasing from the opening extending in the direction of its longitudinal axis, and a substantially coaxial inner sleeve of plastics material positioned in said connector body, the inner sleeve being of a substantially frusto-conical shape substantially complementary to the bore in the connector body and having a bore extending in the direction of its axis with a substantially rounded cross section being smaller than or equal to that of a pipe to be located in the connector, the method including inserting a pipe into the bore and into frictional engagement with the inner sleeve of the connector, and subsequently withdrawing the pipe in the opposite direction to insertion whereupon the inner sleeve member is wedged into frictional engagement and connection to the pipe and the inner surface of the connector body to complete engagement of the pipe in the connector characterized in that the frictional co-efficient (or the frictional resistance to movement) between the pipe and the inner sleeve exceeds the frictional co-efficient between the inner sleeve and the connector body.

In a first preferred embodiment the connector body includes an inwardly depending lug(s) member(s) adapted to extend into any one or more or the recesses in the inner sleeve, the arrangement being such that the inwardly depending lug or lugs are removably engagable in any one or more or the recesses in the inner sleeve to prevent or enable movement of the inner sleeve within the connector body which respectively prevents or enables the inner sleeve to be wedged into frictional engagement between the pipe and the connector body, the arrangement providing for the pipe to thereby be engaged or disengaged in the connector as may be required.

In preferred embodiments the inner surface of the inner sleeve member includes at least one preferrably circumferential tooth member which is adapted to engage the surface of the elongate pipe.

In preferred embodiments, a continuous upstanding ridge portion is provided about the inner surface of the inner sleeve as a continuous tooth member adapted to engage the surface of the elongate pipe.

In preferred embodiments, the connector member of the invention may be adapted to be assembled with, or engaged or connected to one or more other connectors to provide a standard pipe joint, a 'T' junction, or a multiple junction of the connector and other fittings.

BRIEF DESCRIPTION OF THE DRAWINGS

The invention, which should be considered in all its novel aspects, will now be described by way of example only, and with reference to preferred embodiments as shown in the accompanying drawings wherein.

DETAILED DESCRIPTION

Figure 1:
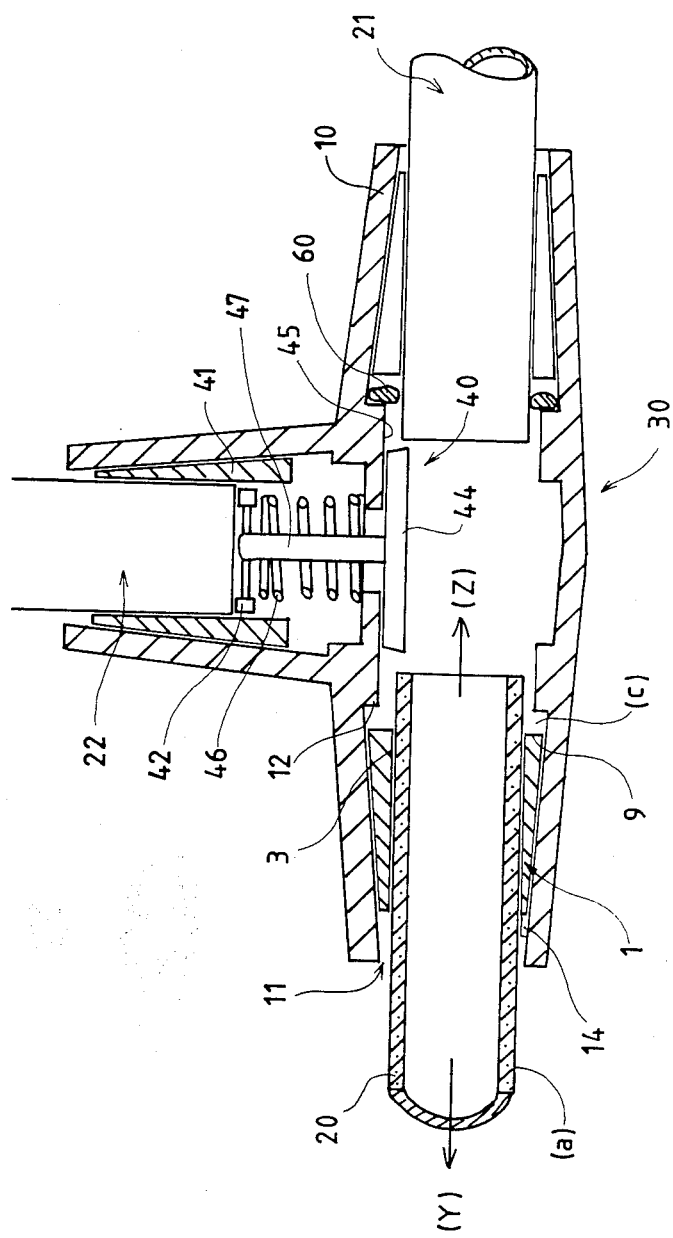
FIG. 1 is a part cut away cross-sectional view of a connector member according to one preferred embodiment of the invention, and when used as a pipe joining connector and including an automatic shut-off valve in a 'T' junction.

The connector according to the present invention has particular use in relation to the connection of elongate pipe or tube of a substantially round cross-section-generally of a diameter of up to say 100 mm although this should not be considered as a limitation of the application of the invention. In one preferred form of the invention the connector will be used in conjunction with plastics pipe which has particular application in relation to the medium or high pressure water supply and irrigation systems utilizing polyethylene or other similar flexible plastic pipe. In this example the pipe diameter would be approximately 15-50 mm. In other embodiments and applications of the invention it is envisaged that the connectors could be used upon metal pipes of all types and particularly where it is desirable to removably engage and locate a connector on a pipe or tube without the necessity for tools or to work the actual pipe or tube.

The invention provides a connector to which a pipe may be conveniently engaged (and in preferred embodiments disengaged), and which has a wide variety of uses. The invention will be described with reference to the preferred embodiments as shown in the drawings in which the connector provides a connection between two adjacent lengths of elongate pipe, with a third outlet being provided as an automatic shut-off valve. This is however only one possible application of the invention.

Figure 2:
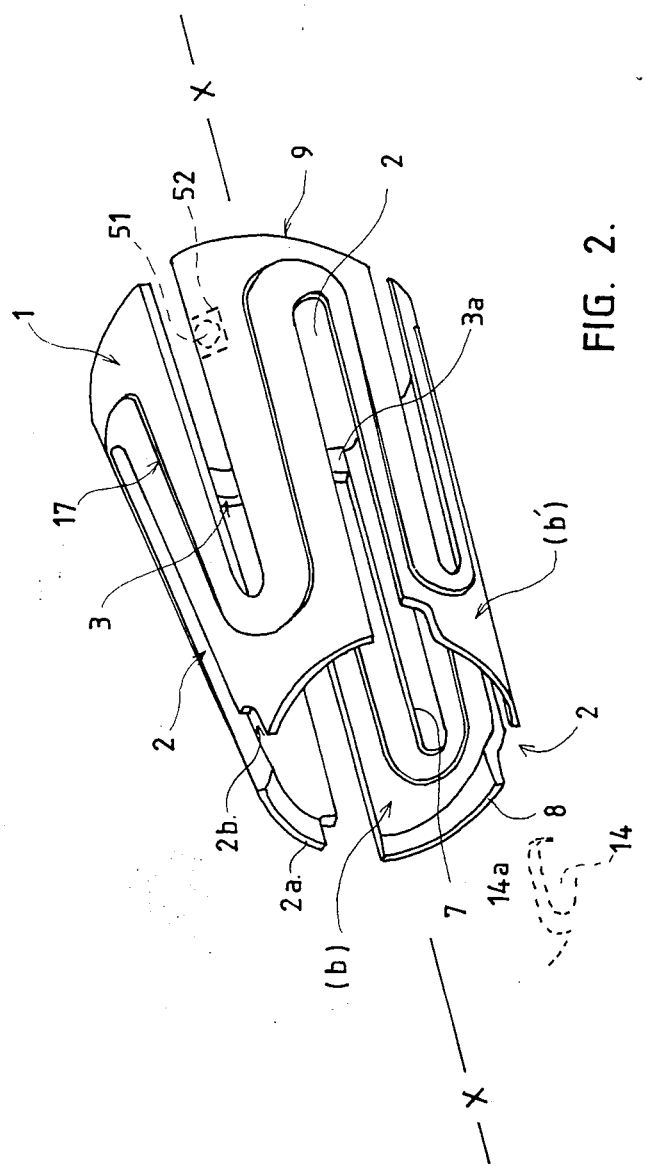
FIG. 2 is an enlarged perspective view of the inner sleeve according to one preferred embodiment of the invention.

In the preferred embodiment the connector generally indicated by 30 is referred to as the assembled, or complete, device which functionally together with all parts thereof achieves the connection, the connector body is the element having the frusto-conical shaped outer part 10, and the inner sleeve member 1 is an elongate plastics member of a substantially frusto-conical shape as shown in FIG. 2 of the drawings including an axial bore (x—x) of a diameter generally less than or equal to the diameter of the pipe or tube to be engaged in the connector. The inner surface (b) of the inner sleeve member is thus adapted to make some frictional adhesion to the surface (a) of the pipe 20 because of the natural pre-tension of the inner sleeve when fitted on the pipe. The outer surface (b) of the inner sleeve member is provided with a preferably constant taper throughout its length from one end to the other at an (included) angle within the range of 1-7 degrees, and in the example shown of approximately 4 degrees.

The arrangement is therefore such that the inner sleeve member 1 is provided as a tapered wedge means which has some natural frictional contact with the surface of the elongate pipe upon which it is placed i.e. frictional interface (a-b) in the drawings.

The inner sleeve member 1 is preferably formed of a slightly pliable plastics material having some natural resilience and includes at least one and preferably a plurality of elongate slots or recesses 2 extending through the sleeve from each end thereof for a substantial part of but not the complete length of said inner sleeve. The slots or recesses 2, together with the pliant and resilient nature of the plastics material, enable the inner sleeve member to be compressed between the less pliable pipe and the connector body housing to provide a firm frictional engagement and fluid tight fit between the elongate pipe and the connector (in a manner to be described).

In one possible embodiment where the connector is to be used as a plumbing fitting and the pipe is a polyethylene pipe, the inner sleeve may be formed of acetal. Alternative materials include nylon, possibly glass-reinforced nylon.

The materials to be used, and the possible working of the inner surface of the inner sleeve member has an effect upon the coefficient of friction of the inner interface (a-b) shown in FIG. 1. It is considered to be an important principle of the invention that the ratio of the co-efficient of friction (or the frictional resistance to movement) between the inner sleeve and the connector body i.e. the outer interface (b'-c) in FIG. 1 should be significantly less than the co-efficient of friction (or the frictional resistance to movement) between the pipe and the inner surface of the inner sleeve (i.e. the inner interface (a-b) in FIG. 1). This arrangement is necessary to ensure that when the pipe is to be engaged in the connector movement will occur between the inner sleeve and the connector body (i.e. the outer interface) before there is any movement between the inner interfaces. This order of movement provides the initial collet engagement to ensure a proper connection of the pipe in the connector.

The increased frictional co-efficient of friction or frictional resistance on the inner interface (a-b) in FIG. 1 is achieved by one or more of the following methods:

(a) Providing the plastics inner sleeve member in a slightly lesser diameter than the outside diameter of the elongate pipe member so that the plastics sleeve member when fitted over has a certain natural pretension on the elongate pipe member; and/or (b) Providing an upstanding ridge 7 of continuous length about the inner surface of the inner sleeve, which ridge member is (in cross section) shaped as a tooth; and (c) (Alternatively) by providing a worked or "roughened" inner surface on the inner sleeve. (This is however a less preferred alternative).

In all preferred embodiments of the invention, the diameter of the bore of the inner sleeve will be either less than or substantially correspond to the outside diameter of the pipe upon which it is to be fitted. This means that when the pipe is pushed into the inner sleeve, there will be a natural frictional contact between the surface of the pipe and the inner surface of the inner sleeve. It will be appreciated that where the diameter of the inner sleeve is less than the diameter of the pipe, the inner sleeve will be expanded so that the friction is increased by the natural pre-tension of the inner sleeve in this position. In all embodiments, the tapered bore of the connector body will be sufficient to allow for this expansion of the inner sleeve.

In preferred embodiments of the invention a continuous tooth 3 is also provided on the inner surface of the sleeve member about the circumference of the inner surface and preferably adjacent to the rear end 9 of the inner sleeve. The tooth member could, however, alternatively be provided adjacent to the front end of the inner sleeve. This tooth member 3 may preferrably be a tooth with a substantially triangular shape (in cross-section) approximating a right angle triangle shape. This provides that the pipe when inserted into the inner sleeve will slide over the tooth 3 from the front end of the inner sleeve tooth member during insertion. However, when the pipe is pulled back, the leading edge 3a of the tooth member will tend to be depressed into the surface of the pipe or tube member. This tooth member accordingly has the effect of frictionally engaging the pipe in the inner sleeve to increase the frictional resistance of the inner interface (a-b).

In many of the proposed uses of the connector it is necessary to ensure that there is a fluid-tight seal between the outside of the pipe, and the inner sleeve (a-b) and between the inner and outer sleeve (b-c). For this reason the recesses or slots 2 do not pass completely along the length of the inner sleeve member 1. In many applications it may be that the invention as described will be sufficient to provide a frictional fit and thus a fluid-tight connection between the outside of the pipe and the inner sleeve member. However, it is also considered advantageous in preferred embodiments to provide a substantially serpentine-like ridge member 7, being a ridge or a substantially triangular cross-section encircling in a continuous ring or band about the inner surface (b) of the inner sleeve. The ridge is adapted to engage and/or penetrate the surface of the pipe about which it is fitted, to provide a fluid-tight connection. This ridge is in preferred embodiments also of a substantially trangular shape (in cross-section) to provide the same function as tooth 3, and to additionally assist in the sealing of the inner interface. It is possible that a similar ridge 17 may be provided on the outer face of the sleeve to assist the sealing ability of the outer interface.

If the pipe is a relatively soft rubber or plastics pipe, then in preferred embodiments a metal or hard plastic sleeve will be inserted into the end of the pipe before it is inserted into the connector. This will provide sufficient strength to support the shape of the pipe to enable the ridge member 7 to engage and or penetrate the surface of the pipe.

The connector will in preferred embodiments be formed to be assembled with (or connected to) other connectors and fittings generally indicated by arrow 30. In particular, the connector body having tapered ends 10 will preferably be comprised of a high strength plastics material, such as nylon or acetal. The material which is used will depend upon the type of connector which is to be provided. However, it will be important that the plastics material of which the body of the connector is comprised is sufficiently rigid to operate in conjunction with the inner sleeve of the connector, and sufficiently durable material for continuous long term use.

The connector body will generally be assembled with at least one other fitting to provide the connector 30. In the example shown in the drawings, the connector body is provided as a part of a connector in the form of a 'T' junction including two fittings for a pipe member, and a third fitting adapted to receive a pipe and operating as an automatic shut-off valve of a type suitable for an irrigation system. This however is only one possible example of the range of uses of the connector herein described.

The inner surface (c) of lock tapered end 10 of the connector body is provided with a taper substantially corresponding to the outer surface (b*) of the frustoconical inner sleeve 1. In preferred embodiments the inner sleeve is adapted to be retained in the connector body between its opening 11 and inner abutment 12. This ridge could of course be part of an adjacent connector body or fitting such as the inner end of a threaded or push-fitted connector body or attachment. This arrangement provides that the inner sleeve 1 is restrained in its movement along the inner surface (c) of the connector body. The inner sleeve 1 is unable to be withdrawn through the opening 11 because of the taper of the inner surface (c) of the connector body or (optionally) by providing an inwardly depending flange about the opening. Furthermore, the inner sleeve 1 cannot be forced into the connector body beyond abutment 12 since the inner end 9 of the sleeve will abut against the inner abutment 12.

The arrangement of the invention is such that the inner sleeve 1 is inserted into the opening 11 of the connector body tapered end 10. The pipe 20 is then pushed through the bore (x-x) of the inner sleeve 1 to the position shown in FIG. 1 of the drawing, slightly expanding the inner sleeve. This frictional fit of the pipe into the inner sleeve 1 will force the inner sleeve into the connector body so that the inner end 9 of the inner sleeve abuts against the inner abutment 12. Once the pipe is completely inserted into the connector body it will be positioned as shown in FIG. 1 of the drawing. The arrangement is then such that there is a good frictional fit in the interface (a-b) between the surface of the pipe (a) and the inner surface of the inner sleeve (b). In preferred embodiments, this frictional fit is improved by the upstanding serpentine like ridge 7 on the inner surface of the sleeve and (optionally) the tooth member 3 both of which are shaped to be depressed into the surface of the pipe member when an attempt is made to withdraw the pipe from the connector in the manner to be described.

To complete the engagement of the pipe in the connector body, the pipe is pulled in the direction indicated by arrow (y). As suggested, this will cause the upstanding tooth portion 7 and optional tooth 3 to depress into the pipe member and complete the frictional engagement of the inner interface (a)-(b) between the pipe and the inner sleeve. Thereafter, movement of the pipe will cause the inner sleeve to slide outwardly along the inner surface (c) of the connector body tapered end 10. With this movement, a frictional fit will be completed between the outer interfaces (b'-c). A fluid-tight fitting is then completed between the inner and outer interfaces and the pipe will be securely engaged in the connector. The strength of the frictional fit between the inner interface, any longitudinal loads on the pipe, and the natural water pressure in the connector will maintain the connection of the pipe within the connector since all of these forces will tend to increase the forced movement of the inner sleeve member 1 outwardly along the inner surface (c) of the connector body tapered end, thus increasing the frictional engagement of both interfaces. It will be appreciated that subsequent creep of the pipe within the fitting will merely increase the strength of the connection of the pipe within the connector. This means, that the type of creep which has been known to cause problems with other types of fluid connectors is not a problem with the present invention.

In further preferred embodiments upstanding serpentine like ridge 17 is also provided about the outside surface of the inner sleeve. These ridges on both surfaces of the inner sleeve provide for an increased compressive loading on the narrow area of contact to thereby increase the sealing capabilities of the inner sleeve on both of its interfaces.

In one possible alternative the connector includes a sealing ring 60 be provided between the pipe, the body of the fitting, or the connector body 10, and the inner edge 9 of the sleeve 1. This may be advantageous where (because of materials) a supplement is required to the sealing ridges 7 and 17.

It will be appreciated that the gap between the rear of the sealing ring and the housing of the connector will be of sufficient length to enable the movement of the sleeve member for the positioning of the sealing ring. If excessive pressure is applied to the connector, the sealing ring 60 will be forced along the frustoconical inner surface of the connector body to form a seal between the pipe, the inner end of the sleeve member and the inner surface of the connector. This accordingly acts in addition to the seal provided by the sleeve member itself.

In preferred embodiments the invention provides for the pipe to be removably engageable in the connector body tapered end 10. In this embodiment, the invention includes lug members 14 which are provided as inwardly depending elongate lugs extending near the opening 11 from the connector body. These lug members 14 are adapted to fit into any of the elongate recesses or slots 2 in the inner sleeve. By way of explanation only, a dotted illustration of one such lug member 14 is shown in FIG. 2 of the drawing so that its dimensions can be appreciated. It will be seen that the lug member 14 is adapted to slidably fit within recess 2 of the inner sleeve member.

In this embodiment, the lug member 14 will slide into one of the recesses 2 when the pipe and the inner sleeve member are forced in the direction indicated by arrow (y). However, if the pipe is then to be withdrawn from the connector it is necessary to push the pipe into the connector in the direction indicated by arrow (z). The lug 14 will then slide out of recess 2. Rotation of the pipe then causes the rotation of the inner sleeve 1. In turn, the edge 14(a) of the lug is adapted to abut against the outer edge, or lip, 2(a) of the inner sleeve member. It will be appreciated that the inner sleeve will thus be contained in the connector body between the ridge 12 and the edge 14(a) of the lug member and is thereby prevented from movement in either direction within the connector body. When the inner sleeve member is so positioned, it is possible to withdraw the pipe 20 in the direction indicated by arrow (y) out of the connector body as the inner sleeve can no longer wedge between the pipe and the outer sleeve. As and when required, the pipe (or any other pipe) may then be reinserted into the connector to the position shown in FIG. 1 and rotated so that the inner sleeve is itself rotated. By this movement lug member 14 is realigned with the recess 2 or any of the other recesses in the inner sleeve. The inner sleeve, will have engaged the pipe member and the pipe is moved in direction (y) to complete the reconnection.

It will also be appreciated that the method of locking the inner sleeve in position to enable withdrawal of the pipe from the connector could involve several possible alternatives. In particular, a lug member could be integrally formed on either the inner sleeve or the connector body. This lug member could then fit into an appropriate recess on either the front mid-portion or rear of the inner sleeve or the connector body. One possible example of this is shown in FIG. 2 (in dotted line) including lug 51 to fit into recess 52 in the rear (or middle of) the connector body/inner sleeve. In this embodiment lug 51 could be disengaged from recess 52 and slide in recess 2 to engage the pipe in the connector.

In one possible embodiment the provision of the lug member 14 adapted to fit within the recess 2 in the inner sleeve provides a visual indication as to whether the connector is in a locked or unlocked position.

In preferred embodiments a secondary recess 2b will be provided adjacent each recess 2 which opens towards the front end of the inner sleeve member. In preferred embodiments, a plurality of lug members 14 will be provided in the connector body to correspond to the number of secondary recesses 2b. The lug members will slide within the primary recesses 2 during insertion and engagement of the pipe within the connector. However, as described in the preceding paragraph, when the pipe is to be removed from the connector, it is pushed into the connector in the direction indicated by arrow (z). The lug member 14 will then slide out of primary recess 2, and rotation of the pipe member causes rotation of the inner sleeve member 1. In turn, each lug 14 will by this movement be positioned in a secondary recess 2b. The inner sleeve will then be contained in the connector and prevented from movement in either direction so that the pipe can be withdrawn from the connector.

By this invention, a pipe may be readily engaged and disengaged from a connector without the use of tools and without any working of the end of the pipe member. Furthermore, because of the longitudinal load exerted by the water pressure on the pipe in the direction indicated by arrow (y), the inner sleeve is inclined towards a tighter frictional fit with the tapered inner surface (c) of the connector body.

The arrangement of the substantially complementary tapered surfaces between the inner sleeve and the connector body provides for a tapered collet type self locking arrangement so that the larger the pressure or longitudinal load exerted by the pipe, then the tighter the grip of the connector on the pipe. This locking arrangement is therefore effective to always counteract and eliminate creep of the pipe, or any tendency towards disengagement of the pipe from the connector. Furthermore, this grip applies only in one direction so that the pipe may be readily unlocked from the connector by movement in direction (z) opposite to the longitudinal loading direction (y).

In one preferred use of the invention, the connector member 30 will be provided as a T junction into which pipe members 20 and 21 may be inserted and which has an automatic shut off valve generally indicated by arrow 40. This type of system has one use in connection with irrigation systems, where it is necessary to removably engage a branch fitting into a main supply pipe, being the pipe 20-21. In this embodiment, a plunger member extends within the inner sleeve by which the pipe 22 is adapted upon insertion into the connection to operate an automatic shut off valve. In the embodiment disclosed, the plunger head 42 is adapted to engage the leading inner edge of the pipe 22. The plunger head 42 is connected to a valve head 44 by stem 47. The arrangement is such that as the pipe 22 is inserted into the inner sleeve 41 the end of the pipe abuts against the plunger head 42 to open head 44 from valve seat 45. The pipe 22 is then engaged with the inner sleeve in the connector body in the manner previously described to complete the connection in the connector. Upon removal of the pipe 22 the compressed spring 46 is again extended and is adapted to reclose the valve head 44 on valve seat 45. The arrangement as shown in FIG. 1 of the drawings depicts the pipe 22 in position immediately prior to engagement in the connector, and opening of the valve. It will be appreciated that alternative embodiments for automatic shut off valves, conventional fluid fittings or any other type of connector or fitting or coupling may be provided in conjunction with the connector as described herein.

For example, sprinkler heads, further standard connectors, four way junctions, hose couplings or snap couplings, or any other type of fitting or apparatus may be provided integrally formed with the connector 30 as described according to this invention depending upon the purpose desired.

The invention therefore provides a connector which is particularly suitable for use in relation to connecting pipes or tubes of generally round cross section whether or not the pipe or tube has a smooth and/or plastic surface. The invention provides for fluid-tight grip of the connector parts on the pipe or tube and in preferred embodiments provides for removable engagement of the pipe within the connector.

Finally, it will be appreciated that the invention has been described by way of example only and that modifications, alterations and additions may be made to the invention without departing from the scope thereof.

I claim:

1. A releasable connector comprising:
    a connector body having an opening at one end;
    a tapered bore extending inwardly in said connector body from said opening and increasing in diameter from said opening inwardly;
    a substantially coaxial inner sleeve of plastics material positioned in said tapered bore having a substantially frustoconical shape with inner and outer ends, said outer end being nearer said opening;
    an outer surface on said inner sleeve substantially complementary to said tapered bore;
    a bore through said inner sleeve extending in the direction of the central axis thereof defining an inner surface having a rounded cross-sectional configuration substantially complementary to that of a connected member to be connected when inserted into said inner sleeve;
    at least one substantially elongated slot through the wall of said inner sleeve extending from one of said ends of said inner sleeve and terminating short of the other of said ends so that said inner sleeve is pliable; and
    circumferentially continuous sealing means on said inner and outer surfaces of said inner sleeve, said tapered bore and outer surface on said inner sleeve having relative sizes and said inner surface on said inner sleeve having a size relative to the connected member and being adapted so that when the connected member is inserted into said bore in said inner sleeve the connected member frictionally engages said inner surface and reverse movement of the connected member in the direction opposite to said direction of insertion displaces said inner sleeve into wedging and circumferentially continuous sealing and connecting engagement with said tapered bore and into circumferentially continuous sealing and connecting engagement with the connected member for sealingly connecting the connected member in said connector body.

2. A releasable connector as claimed in claim 1 and further comprising:
    at least one tooth member on said inner surface of said inner sleeve adapted to assist engagement with the outer surface of said connected member when said connected member is forced in the direction opposite to said direction of insertion thereof for further retaining said connected member in said connector body upon further force in said opposite direction.

3. A releasable connector as claimed in claim 1 and further comprising:
    a sealing ring adjacent the inner end of said inner sleeve between said tapered bore and said connected member to provide further sealing engagement of said connected member in said connector body.

4. A connector as claimed in claim 1 wherein said sealing means on said inner surface of said inner sleeve comprises:
    a circumferentially continuous upstanding ridge portion on said inner surface of said inner sleeve to sealingly engage the outer surface of the connected member.

5. A connector as claimed in claim 1 wherein said sealing means on said outer surface of said inner sleeve comprises:
    a circumferentially continuous upstanding ridge portion on said outer surface of said inner sleeve to sealingly engage said inner sleeve with said tapered bore.

6. A method of connecting a substantially round connected member in a releasable connector including a connector body having an opening at one end and a tapered bore of increasing diameter from said opening extending inwardly in said connector body, a substantially coaxial inner sleeve of plastics material positioned in said tapered bore, said inner sleeve having a substantially frustoconical shape with inner and outer ends, the outer end being nearer the opening, and an outer surface substantially complementary to said tapered bore, a bore through said inner sleeve extending in the direction of the central axis thereof defining an inner surface having a rounded cross-sectional configuration substantially complementary to that of the connected member to be connected when inserted into said inner sleeve, at least one substantially elongated slot through the wall of said inner sleeve extending from one of said ends of said inner sleeve and terminating short of the other of said ends so that said inner sleeve is pliable, and circumferentially continuous sealing means on said inner and outer surfaces of said inner sleeve, said tapered bore and outer surface on said inner sleeve having relative sizes and said inner surface on said inner sleeve having a size relative to the connected member and being adapted so that when the connected member is inserted into said bore in said inner sleeve the connected member frictionally engages said inner surface, the method comprising:
    inserting the connected member into the bore of the inner sleeve and into frictional engagement therewith; and
    withdrawing the connected member in the direction opposite to the inserting direction displacing the inner sleeve into wedging and circumferentially continuous sealing and connecting engagement with the tapered bore and into compressed and circumferentially continuous sealing and connecting engagement with the connected member to connect the connected member to the connector body, wherein the coefficient of friction of the connection between the inner sleeve and connected member exceeds the coefficient of friction of the connection between the inner sleeve and the connector body.

7. A releasable connector comprising:
a connector body having an opening at one end;
a tapered bore extending inwardly in said connector body from said opening and increasing in diameter from said opening inwardly;
a substantially coaxial inner sleeve of plastics material positioned in said tapered bore having a substantially frustoconical shape with inner and outer ends, the outer end being nearer said opening;
an outer surface on said inner sleeve substantially complementary to said tapered bore;
a bore through said inner sleeve extending in the direction of the central axis thereof defining an inner surface having a rounded cross-sectional configuration substantially complementary to that of a connected member to be connected when inserted into said inner sleeve;
at least one substantially elongated slot in said inner sleeve extending from said outer end of said inner sleeve and terminating short of said inner end so that said inner sleeve is pliable;
circumferentially continuous sealing means on said inner and outer surfaces of said inner sleeve; and
at least one lug member projecting inwardly from said tapered bore adjacent said opening in said connector body removably engageable in said at least one slot for facilitating movement of said inner sleeve inwardly and outwardly in said tapered bore, and engageable with said outer end of said inner sleeve upon rotation of said inner sleeve with respect to said connector body for preventing outward movement of said inner sleeve in said tapered bore, said tapered bore and outer surface on said inner sleeve having relative sizes and said inner surface on said inner sleeve having a size relative to the connected member and being adapted so that when the connected member is inserted into said bore in said inner sleeve said connected member frictionally engages said inner surface and reverse movement of said connected member in the direction opposite to said direction of insertion displaces said inner sleeve into wedging and circumferentially continuous sealing and connecting engagement with said tapered bore and into circumferentially continuous sealing and connecting engagement with the connected member for sealingly connecting the connected member in said connector body.

8. A releasable connector as claimed in claim 7 and further comprising:
at least one tooth member on said inner surface of said inner sleeve adapted to assist engagement with the outer surface of the connected member when the connected member is forced in the direction opposite to said direction of insertion thereof for further retaining the connected member in said connector body upon further force in said opposite direction.

9. A connector as claimed in claim 8 wherein said sealing means on said inner surface of said inner sleeve comprises:
a circumferentially continuous upstanding ridge portion on said inner surface of said inner sleeve to sealingly engage the outer surface of the connected member.

10. A connector as claimed in claim 9 wherein said sealing means comprises:
a circumferentially continuous upstanding ridge portion on said outer surface of said inner sleeve to sealingly engage said inner sleeve with said tapered bore.

11. A releasable connector comprising:
a connector body having an opening at one end;
a tapered bore extending inwardly in said connector body from said opening and increasing in diameter from said opening inwardly;
a substantially coaxial inner sleeve of plastics material positioned in said tapered bore having a substantially frustoconical shape with inner and outer ends, said outer end being nearer said opening;
an outer surface on said inner sleeve substantially complementary to said tapered bore;
a bore through said inner sleeve extending in the direction of the central axis thereof defining an inner surface having a rounded cross-sectional configuration substantially complementary to that of a connected member to be connected when inserted into said inner sleeve;
at least one substantially elongated slot in said inner sleeve extending from one of said ends of said inner sleeve and terminating short of the other of said ends so that said inner sleeve is pliable;
circumferentially continuous sealing means on said inner and outer surfaces of said inner sleeve;
at least one recess in said inner sleeve extending from said slot substantially transverse thereto; and
at least one lug member projecting inwardly from said tapered surface removably engageable in said at least one slot for facilitating movement of said inner sleeve inwardly and outwardly in said tapered bore, and engageable in said recess upon rotation of said inner sleeve with respect to said connector body for preventing outward movement of said inner sleeve in said tapered bore, said tapered bore and outer surface of said inner sleeve having relative sizes and said inner surface on said inner sleeve having a size relative to the connected member and being adapted so that when the connected member is inserted into said bore in said inner sleeve the connected member frictionally engages said inner surface and reverse movement of the connected member in the direction opposite to said direction of insertion displaces said inner sleeve into wedging and circumferentially continuous sealing and connecting engagement with said tapered bore and into circumferentially continuous sealing and connecting engagement with the connected member for sealingly connecting the connected member in said connector body.

12. A connector as claimed in claim 11 wherein said sealing means on said outer surface of said inner sleeve comprises:
a circumferentially continuous upstanding ridge portion on said outer surface of said inner sleeve to sealingly engage said inner sleeve with said tapered bore.

13. A connector as claimed in claim 12 wherein said sealing means further comprises:
a circumferentially continuous upstanding ridge portion on said inner surface of said inner sleeve to sealingly engage the outer surface of the connected member.

14. A connector as claimed in claim 11 wherein:
said at least one slot comprises a plurality of slots;
said at least one recess comprises a plurality of recesses; and
said at least one lug member comprises a plurality of lug members.

* * * * *